Nov. 6, 1945.  P. OSTERGAARD  2,388,642
APPARATUS FOR CONTINUOUS CONVERSION OF HYDROCARBONS
Filed Nov. 18, 1942  2 Sheets-Sheet 2
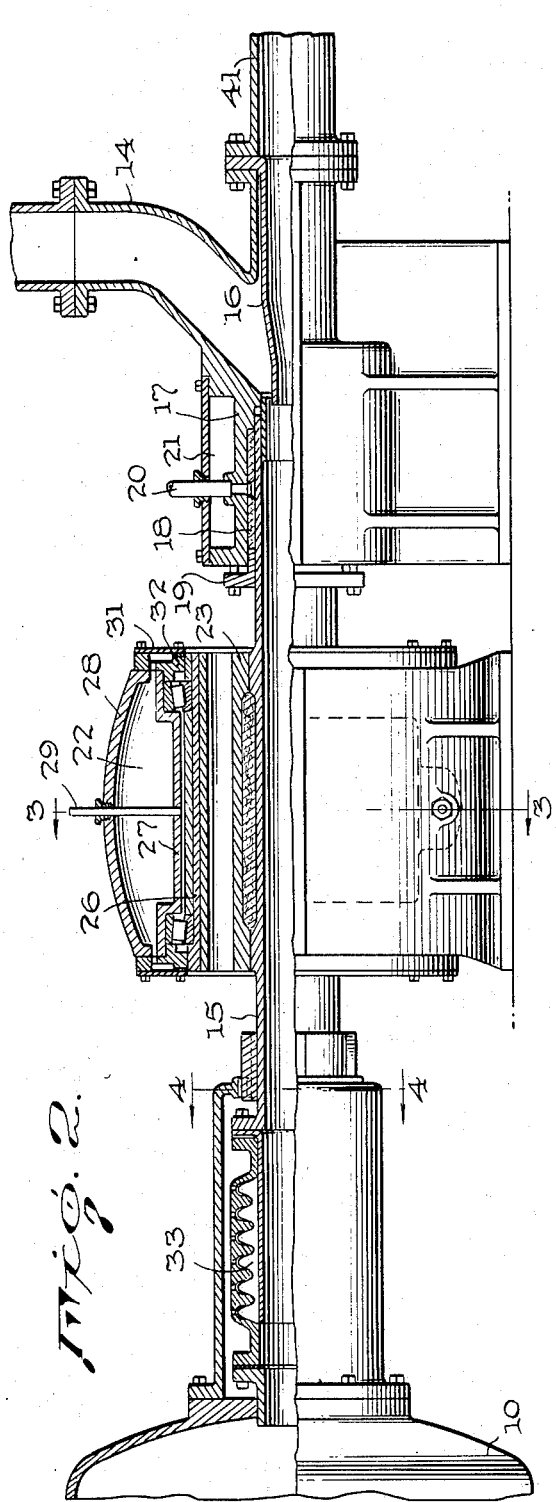
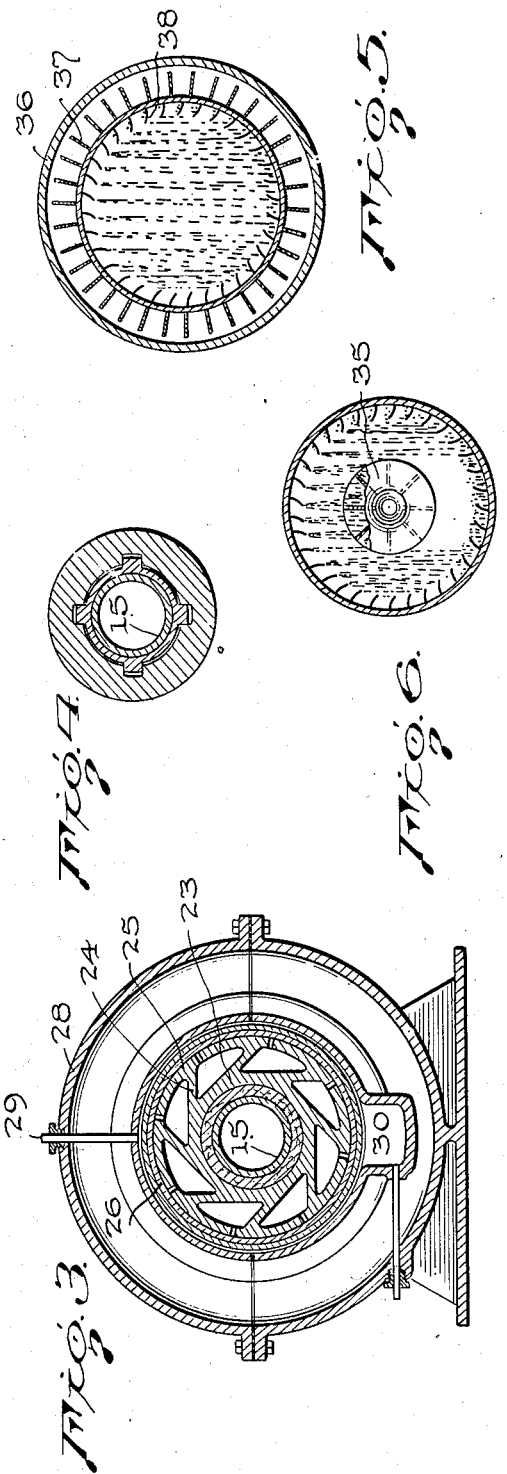
INVENTOR.
Poul Ostergaard
BY
his ATTORNEY Patented Nov. 6, 1945

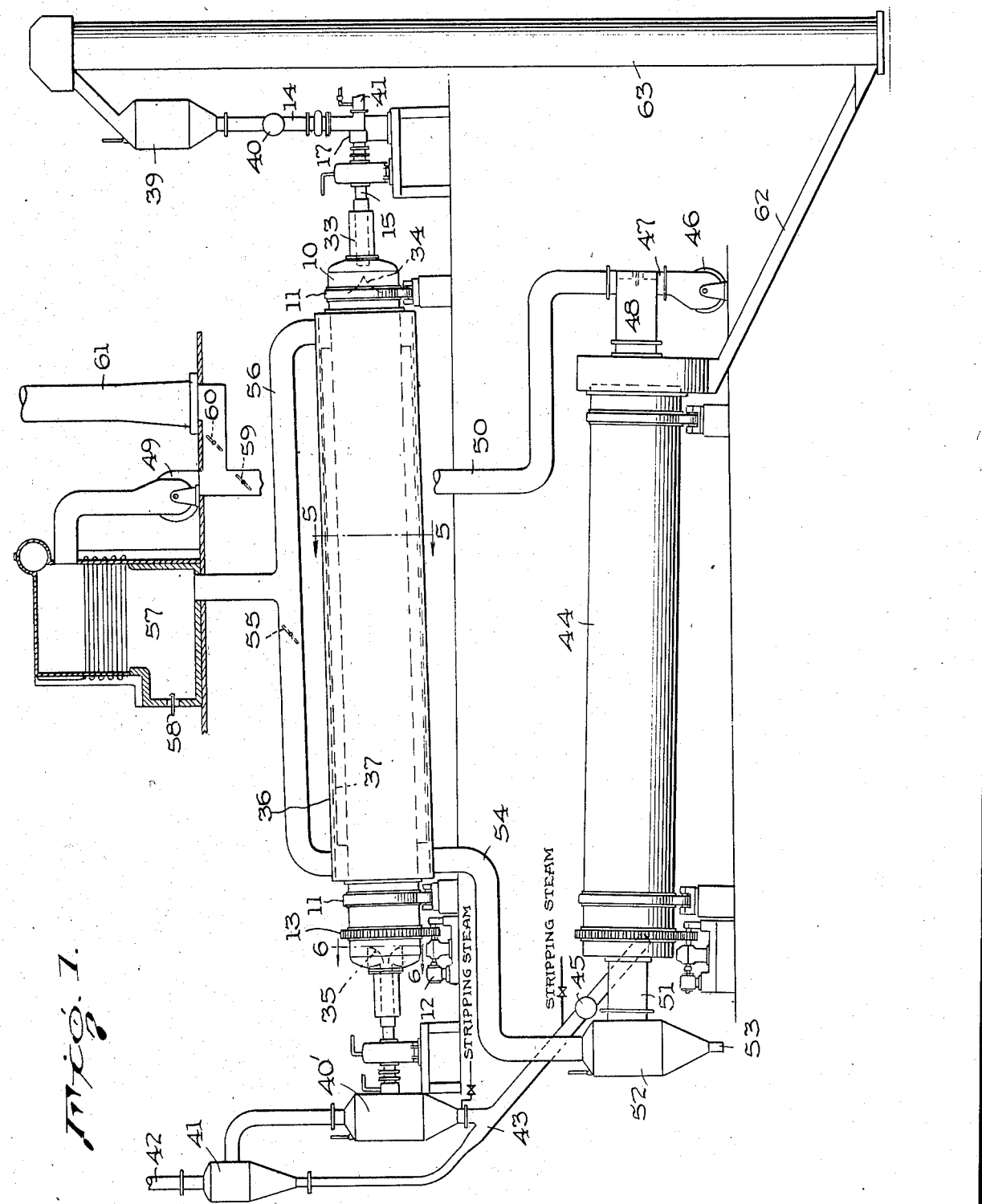

2,388,642

UNITED STATES PATENT OFFICE 2,388,642

APPARATUS FOR CONTINUOUS CONVERSION OF HYDROCARBONS

Povl Ostergaard, Mount Lebanon, Pa., assignor to Gulf Oil Corporation, Pittsburgh, Pa., a corporation of Pennsylvania Application November 18, 1942, Serial No. 466,032

2 Claims. (Cl. 196—52)

This invention relates to an apparatus for continuous catalytic conversion of hydrocarbons wherein a catalyst introduced into an elongated rotating drum is kept in continuous agitation in its passage therethrough, being lifted and dropped as a rain in contact with hydrocarbon vapors flowing through the drum, with subsequent separation of the reaction products and regeneration of the catalyst for re-use; the apparatus employed for such conversion of the hydrocarbons and regeneration of the catalyst being so constructed and arranged that substantially isothermal operation is attained with catalysts of a wide variety of textures.

In general, there are three types of catalytic conversion process, namely, the stationary and moving bed types, and the fluid type, each of which requires a catalyst of particular texture. The catalyst employed in the stationary and moving bed types must be coarse to the extent that adequate voids exist in the bed for vapor passage. In the fluid type, on the other hand, the catalyst must be finely pulverized to float in suspension. The present invention utilizes either coarse or pulverized catalyst with equal facility, and provides for substantially isothermal conditions of conversion because the catalyst is maintained in effective thermal relation with a heat exchange medium in its travel through the conversion drum. Most catalysts have poor thermal conductivity and, in mass, must not be much more than three inches from the heat exchange medium in order to maintain uniform temperature.

Thus, in the fixed bed type of process the catalytic mass is penetrated by arrangements of fins and tubes through which heat exchange media are circulated to impart uniformity of temperature to the bed; otherwise the variations of temperature which exist in different parts of the bed are likely to cause over-cracking at certain points and, in regeneration of the catalyst, may result in degradation from local overheating of regions in the mass.

In the fluid type of process uniform temperature is obtained by turbulence of the catalyst in contact with the circulated hydrocarbon vapor which supplies the sensible heat of reaction. For this reason there is a reduction in the temperature of the catalyst and vapors flowing through the reactor.

Similar limitations are imposed upon the moving bed type process wherein the catalyst flows countercurrent to ascending vapor. The catalyst enters the reactor at a temperature of 50° to 75° above the average reaction temperature so that the heat of reaction is furnished from the sensible heat in the catalyst above the average reaction temperature.

It is accordingly an object achieved by this invention to provide for catalytic conversion of hydrocarbons under uniform temperature conditions and with a catalyst of any of a wide variety of textures.

Another object of the invention is to provide apparatus for catalytic conversion wherein spent catalyst is continuously regenerated and re-used, with heat exchange between the exothermic and endothermic reactions, the apparatus for performing such process being so constructed that the catalyst in passage is continuously raised and dropped crosscurrent to the flow of hydrocarbon vapor.

A further object of the invention is to provide apparatus for catalytic conversion of hydrocarbon vapors, the vapors passing through a rotary reaction chamber with a catalyst which is continuously lifted and dropped, the apparatus being so constructed and arranged that heat input for reaction is controlled and supplied to the exterior walls of the reaction chamber, and transmitted therethrough to the catalyst, to afford temperature control at the optimum level depending upon the feed and the reaction desired.

In furtherance of the foregoing and other objects and advantages which will be apparent from the following description it is to be understood that although the same is directed to an apparatus for catalytically cracking a hydrocarbon oil vapor, the apparatus is equally applicable to such processes as the dehydrogenation of normal butane to butylene, and of butylene to butadiene, the desulfurization of oils, isomerization of normal butane to isobutane, and vapor phase alkylation of butenes or pentenes with isobutane.

In the drawings:

Figure 1 is a diagrammatic layout of the apparatus for continuous conversion and catalyst regeneration for re-use.

Figure 2 is a side view, partly in section, of the trunnion bearing and seal at the drum inlet.

Figure 3 is a vertical sectional view, taken along line 3—3 of Figure 2, of the trunnion bearing construction.

Figure 4 is a vertical sectional view taken along line 4—4 of Figure 2.

Figure 5 is a vertical sectional view through the rotating drum and its surrounding jacket, taken along the line 5—5 of Figure 1.

Figure 6 is a vertical sectional view through the drum beyond its jacketed portion, taken along the line 6—6 of Figure 1.

An elongated drum 10 is mounted for rotation in a conventional manner upon rollers engaging with the annular trackways 11, the support being such that the drum has a slight downward inclination from inlet to discharge. Drive means in the form of a motor 12 and ring gear 13 meshing with a pinion on the motor shaft causes rotation of the drum at a speed which may be controlled according to the demands of the process.

The trunnions at the opposite ends of the drum are hollow for receiving and discharging the contents which is passed therethrough, and these are attached to the fixed inlet and discharge conduits in a manner which prevents leakage under operating pressure either above or below atmospheric pressure. To this end, as shown in Figure 2, a conduit 14 discharges catalyst into the tubular extension 15 which constitutes the drum trunnion, at its junction with the inlet nozzle 16 through which hydrocarbon vapors are admitted. A packing box 17 surrounds the joint and provides a seal between the rotary element 15 and the fixed conduits by means of interposed packing 18 retained by a gland follower 19. The packing is in the form of a lantern gland to which steam or inert gas is admitted through line 20 so that an effective back pressure is established which prevents leakage of hydrocarbon vapors to atmosphere and, likewise, entrance of air into the system is avoided when the operation is conducted under vacuum. A water jacket 21 surrounds the packing box for cooling.

The tubular trunnion 15 is journaled in a bearing 22 which is so constructed that its anti-friction elements will not be subjected to undue pressure under expansion of the parts caused by heat transmitted from the reaction drum. Thus, the inner bearing support comprises a sleeve 23 received upon the trunnion 15 and formed with integral tangentially extending spokes 24 which terminate in arcuate webs 25 slightly spaced apart to allow for expansion and contraction in response to temperature changes. The construction of the inner bearing support permits the force exerted by expansion of the spokes to be taken up circumferentially, without increasing the overall diameter of the support such as might cause binding the anti-friction bearing.

A surrounding sleeve 26 mounts anti-friction bearings of a conventional type adapted to assume both radial and thrust loads. The outer race rings of the bearings are retained and held spaced apart in the enlarged end portions of an outer sleeve 27, the whole being encased as at 28 to define a surrounding water jacket for cooling. The roller bearing is lubricated in any conventional manner as, for example, by forcing lubricant through pipe 29 and removing the same from sump 30 in the event a continuous circulation is employed. Side closure plates 31 carry packings which seal the anti-friction bearing at its ends and prevent ingress of water from the surrounding jacket. The bearing thus provided insures alignment of the trunnion in the packing box 17.

The rotating reaction drum when heated expands in lateral as well as longitudinal dimensions, the tendency thereby being to offset its longitudinal axis laterally to some slight degree which might, nevertheless, destroy the seal which is provided by the packing gland. In order to obviate this a thermal expansion joint 33 which includes a driving connection to relieve the joint proper of torsional strains is provided in the trunnion between the drum and bearing. Such expansion joint acts in the manner of a flexible coupling and, accordingly, is capable of taking up small misalignments by flexure of a corrugated tubular sleeve clamped between sections of the trunnion and reinforced by spaced annular rings retained in the respective corrugations.

As shown in the drawings, the expansion joint 33 includes a surrounding sleeve which is secured for rotation with the drum 10 and which terminates in key elements slidably engaging in corresponding slots of a collar carried by the aligned trunnion section. Longitudinal expansion and contraction are thereby permitted without affecting the mounting of the trunnion in its bearing, or its seal with the catalyst and hydrocarbon conduits, and at the same time a driving connection is established between the sections of trunnions as so supported.

Diverging deflector plates 34 are mounted within the drum 10 at the inlet for the purpose of deflecting the catalyst outwardly toward the wall of the drum. At its outlet the drum has a collecting device 35 in the form of a converging nozzle which, as shown in Figure 6, communicates with externally arranged pockets designated to receive a catalyst and to remove it in mixture with the reaction products for subsequent separation.

A fixed jacket 36 surrounds the reaction drum substantially throughout its length, and the drum, as shown more particularly in Figure 5, is provided with a series of longitudinally extending vanes 37 which transmit heat from an exchange fluid within the jacket space to the wall of the drum and thence to a series of flights 38 which project inwardly from the wall of the drum. Thus the catalyst is picked up by the flights 38 in rotation of the drum while at the same time it is heated by contact with the walls of the drum and the flights. As the flights reach a high point in the drum they distribute the catalyst in the form of a spray or rain which falls to the bottom of the drum crosscurrent to the flow of hydrocarbon vapors. An intimate contact of the catalyst with the vapors is thereby assured, and the heat lost by the catalyst in falling through the vapors is at once regained by contact with the flights and drum wall. Thus, by controlling the supply of heating fluid to the space enclosed by jacket 36, the reaction can be carried on under substantially isothermal conditions.

Catalyst from a hopper 39 is admitted past control valve 40 through the conduit 14 where it mingles with hydrocarbon vapor flowing to the drum through line 41 and nozzle 16. The rate of passage of catalyst through the drum may be controlled by varying the speed of drum rotation and inclination as required by the demands of the process being performed.

Reaction products and spent catalyst are removed from the drum through the eduction member 35 and hollow trunnion which is sealed and supported in the manner previously described, from which the mixture passes to a spent catalyst hopper 40' and thence to a cyclone separator 41 from which cracked oil vapor is removed through line 42. The spent catalyst fines which fall to the bottom of the separator are withdrawn through conduit 43 joining the discharge from the spent catalyst hopper 40' and leading to the regenerating drum 44. Stripping steam is admitted to the spent catalyst lines and the catalyst stripped of vapor is thereafter admitted to the regenerating drum past control valve 45.

The regenerating drum 44 may be similar in construction and arrangement to the reaction drum, but with the catalyst flow in countercurrent to a mixture of air and flue gas which, by burning off the carbon deposited on the catalyst, regenerates the catalyst for re-use. Control of temperature in the regeneration drum is achieved by regulation of the volume of fresh air delivered to the drum from a fresh air fan 46 through lines 47 and 48 in mixture with flue gas which is recirculated by fan 49 through lines 50 and 48. The combustion products emerge from the regenerating drum through line 51 which communicates with a cyclone hopper 52 wherein fines are separated and discharged through outlet 53, the hot combustion gases passing upwardly through line 54 to the jacket 36 which surrounds the cracking drum. By regulation of the damper 55 the heated gases may be made to traverse substantially the entire length of the cracking drum in a direction towards its inlet, thereupon to be discharged through pipe 56 and into a waste heat boiler 57 which is provided with auxiliary burner 58. The return flow of flue gas is controlled by dampers 59 and 60 to be returned either wholly or in part to the regenerating kiln or discharged to atmosphere through stack 61.

Catalyst which has been ejected from the rotary drum 44 is discharged through a chute and communicating conduit 62 to an elevator 63 which may be in the form of a bucket conveyor housed and suitably insulated to retain the sensible heat generated in its reactivation. The hot catalyst thus regenerated is deposited in hopper 39 and is available for further use.

From the foregoing it will be apparent that this invention provides for continuous conversion of hydrocarbon oil vapors in intimate contact with a catalyst which may be of a wide variety of textures, and under conditions which permit of substantially isothermal separation, the process of conversion of the hydrocarbon and of reactivation of the catalyst being accomplished continuously and without interruption; and that the invention further provides an apparatus wherein a rotary retort is sealed at its inlet and outlet against leakage when separated either under sub-atmospheric or super-atmospheric pressure.

What I claim as my invention is:

1. Apparatus for the continuous conversion of hydrocarbon vapor which comprises a rotary drum constituting a reaction chamber provided with internal flights and having an axial inlet and outlet at its respective ends, conduits communicating with the inlet for passage of a catalyst and hydrocarbon vapor into the drum, means for rotatably supporting the drum, a jacket surrounding said drum and extending substantially the length thereof to define a space through which a heat exchange medium flows in contact with the drum, means for separating spent catalyst and reaction products discharged from said drum, a second rotary drum constituting a regenerating chamber to which spent catalyst is delivered, means for admitting air for combustion to said regenerating chamber counter to the flow of catalyst therethrough, means for collecting and returning regenerated catalyst to the reaction chamber, and a conduit for conveying hot combustion gases from the regenerating drum to the jacket space surrounding the reaction drum.

2. Apparatus for the continuous conversion of hydrocarbon vapor which comprises a rotary reaction drum provided with internal flights and having an axial inlet and outlet in its respective ends, conduits communicating with the inlet for passage of a catalyst and hydrocarbon vapor in commingled flow into said drum, a deflector positioned in the inlet of said drum for directing the entering catalyst into contact with the drum wall, means for rotatably supporting the drum in a position inclined downwardly in the direction of its outlet, a jacket surrounding said drum to define a space through which a heat exchange medium is passed for supplying heat to the drum and its contents, heat conducting fins carried by said drum within such jacketed space, said jacket extending substantially the length of said drum, means for separating spent catalyst and reaction products discharged from said drum, a rotary regenerating drum to which spent catalyst is delivered, means for admitting air thereto for combustion, in counterflow to the catalyst undergoing regeneration, a conveyor delivering regenerated catalyst for re-use in said reaction drum, and a conduit for directing hot combustion gases from said regenerating drum to the space surrounding said reaction drum to supply heat thereto, permitting operation under substantially isothermal conditions.

POVL OSTERGAARD.